(12) United States Patent
Xiong et al.

(10) Patent No.: US 11,030,455 B2
(45) Date of Patent: Jun. 8, 2021

(54) POSE RECOGNITION METHOD, DEVICE AND SYSTEM FOR AN OBJECT OF INTEREST TO HUMAN EYES

(71) Applicant: Huazhong University of Science and Technology, Hubei (CN)

(72) Inventors: Caihua Xiong, Hubei (CN); Shikai Qiu, Hubei (CN); Quanlin Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 131 days.

(21) Appl. No.: 16/412,010

(22) Filed: May 14, 2019

(65) Prior Publication Data

US 2020/0311416 A1    Oct. 1, 2020

(30) Foreign Application Priority Data

Mar. 29, 2019 (CN) .......................... 201910252521.9

(51) Int. Cl.
*G06K 9/00* (2006.01)
*G06T 7/73* (2017.01)
(Continued)

(52) U.S. Cl.
CPC ....... *G06K 9/00604* (2013.01); *G06K 9/0061* (2013.01); *G06K 9/3233* (2013.01); *G06T 5/002* (2013.01); *G06T 7/73* (2017.01)

(58) Field of Classification Search
CPC ............. G06K 9/00604; G06K 9/0061; G06K 9/3233; G06T 7/73; G06T 5/002; G06F 3/013
See application file for complete search history.

(56) References Cited

U.S. PATENT DOCUMENTS 10,007,336 B2   6/2018  McMurrough
2012/0120199 A1* 5/2012  Ben Himane ............. G06T 7/75
                                                           348/46
(Continued)

FOREIGN PATENT DOCUMENTS

CN          107773248 A       3/2018

*Primary Examiner* — Amara Abdi
(74) *Attorney, Agent, or Firm* — Hamre, Schumann, Mueller & Larson, P.C.

(57) ABSTRACT

The present disclosure belongs to the field of 3D gaze point recognition and computer vision, and more particularly discloses a pose recognition method, device and system for an object of interest to human eyes, which respectively identifies centers of left and right pupils of a user by using a left eye camera and a right eye camera on an eye tracker to extract information of the user's eyes; maps the obtained centers of the left and right pupils to a left scene camera to obtain a 2D gaze point; extracts bounding boxes of objects in the left scene camera by using target recognition and tracking algorithms, and then determines an object of interest to the user according to a positional relationship between the 2D gaze point and the bounding boxes of the objects; performs 3D reconstruction and pose estimation of the object of interest to the user to obtain a pose of the object of interest in the left scene camera; and converts the pose of the object of interest in the left scene camera to a pose in the world coordinate system, thereby determining a pose of the object of interest to the user. The present disclosure can identify the object of interest to the user and estimate the pose of the object, and has the advantages of high recognition accuracy and high pose estimation accuracy.

8 Claims, 4 Drawing Sheets

(51) Int. Cl.
    *G06K 9/32*        (2006.01)
    *G06T 5/00*        (2006.01)

(56) References Cited

U.S. PATENT DOCUMENTS

| | | | |
|---|---|---|---|
| 2017/0068315 A1* | 3/2017 | Kang | G06K 9/00604 |
| 2017/0243352 A1* | 8/2017 | Kutliroff | G06T 19/006 |
| 2017/0277259 A1* | 9/2017 | Mullins | G02B 27/0172 |
| 2017/0323158 A1* | 11/2017 | Gordon | G06Q 30/06 |
| 2018/0365839 A1* | 12/2018 | Feng | G06T 7/11 |

\* cited by examiner

POSE RECOGNITION METHOD, DEVICE AND SYSTEM FOR AN OBJECT OF INTEREST TO HUMAN EYES

BACKGROUND

Technical Field

The present disclosure belongs to the field of 3D gaze point recognition and computer vision, and more particularly relates to a pose recognition method, device and system for an object of interest to human eyes.

Description of the Related Art

On the one hand, a gaze point of the human eye can be sent out by a person without any effort, and contains rich information, which reflects the psychological activity and state of the person. On the other hand, in daily life, the behavior of the human eye can convey certain information to the outside, for example, the approximate gaze direction and position of a person can be known by observing the person's eyes, and the object of interest to the person can also be known by further combining the scene information. In summary, designing a 3D eye tracker that is easy to operate and capable of capturing the gaze point of the human eye is very helpful for psychological research and human-computer interaction of a specific group of people.

Most of the existing eye trackers only extract the 2D gaze point of the human eyes for psychological research and simple human-computer interaction, and do not extract a 3D gaze point, and thus, the extracted amount of information and its role are limited. A few of the existing eye trackers with the 3D gaze point positioning function have low positioning accuracy, and do not have a head positioning module, resulting in that the user must keep the head fixed when in use, and it is difficult to use in a real-life scenario. For example, CN107773248A discloses an eye tracker and an image processing algorithm, the eye tracker comprising an eye camera and a plurality of scene cameras to extract monocular eye movement information and foreground multi-eye camera information; U.S. Pat. No. 10,007,336 B2 discloses an eye tracker for 3D point of gaze estimation, which also uses an eye camera to record the movement information of a user's eye, and the adopted scene camera is a depth camera which reconstructs an object in the scene through the structured light.

However, the above prior art still has the following problems: 1) the positioning of the human head cannot be realized, so that the gaze point cannot be converted into the world coordinate system for further operation, and the head attitude must be fixed during use, which greatly limits the user's usage scenario and reduces the comfort of use; 2) only one eye camera is used, so that the binocular information cannot be extracted, which reduces the accuracy of the gaze point recognition; 3) the recognition and pose estimation of the object of interest cannot be realized, so that these devices cannot be used for 3D actual working scenes (helping disability and 3D interaction); and 4) CN107773248A utilizes multiple scene cameras, which increases the cost while consuming space resources, and U.S. Pat. No. 10,007,336B2 uses a depth camera, resulting in a cumbersome and costly device.

SUMMARY

In view of the above-described defects or improvement requirements in the art, the present disclosure provides a pose recognition method, device and system for an object of interest to human eyes, which extracts pupil centers of two eyes by two scene cameras and two eye cameras to determine a user's gaze point and ensure the accuracy of the gaze point positioning, accurately identifies the object of interest to the user and estimates the pose of the object with high precision through further combining target recognition and tracking, 3D reconstruction and pose estimation and pose conversion. Therefore, the present disclosure has the advantages of high efficiency, high precision and the like.

In order to achieve the above objective, according to a first aspect of the present disclosure, there is provided a pose recognition method for an object of interest to human eyes, comprising:

S1 respectively identifying centers of left and right pupils of a user by using a left eye camera and a right eye camera on an eye tracker to extract information of the user's eyes S2 mapping the obtained centers of the left and right pupils to a left scene camera to obtain a 2D gaze point;

S3 extracting bounding boxes of objects in the left scene camera by using target recognition and tracking algorithms, and then determining an object of interest to the user according to a positional relationship between the 2D gaze point and the bounding boxes of objects;

S4 performing 3D reconstruction and pose estimation of the object of interest to the user to obtain a pose of the object of interest in the left scene camera;

S5 converting the pose of the object of interest in the left scene camera (4) to a pose in the world coordinate system, thereby determining a pose of the object of interest to the user;

Preferably, the step S1 comprises following substeps:

S11 respectively collecting images taken by a left eye camera and a right eye camera and performing smoothing processing on them to obtain smoothed grayscale images;

S12 transmitting the respective smoothed grayscale images to an edge detector to obtain edge points, performing filtering processing to filter out noise points, thereby leaving edge points corresponding to a pupil boundary, and constructing the edge points corresponding to the pupil boundary as a pupil edge point set; and S13 performing ellipse fitting on the edge points corresponding to the pupil boundary to obtain center coordinates $(x_l, y_l)$ and $(x_r, y_r)$ of the left and right pupils.

Further, a random sample consensus algorithm is adopted to perform ellipse fitting on the edge points corresponding to the pupil boundary to obtain the center coordinates of the left and right pupils, specifically comprising:

S131 randomly selecting 5 points from the respective pupil edge point set to fit a plane parameter equation of an ellipse;

S132 calculating a value of a support function of all inliers in the pupil edge point set to the ellipse; and S133 repeating the steps S131 to S132 for a preset number of times to obtain a parameter equation of an ellipse where the support function has the maximum value, the center of the ellipse being the center of the pupil.

Further preferably, the plane parameter equation of the ellipse is expressed as:

$$Q(x,y)=Ax^2+Bxy+Cy^2+Dx+Ey+F,$$

where A~F are undetermined coefficients;
the inliers are defined as $$\text{inliers}=\{(x,y)|\text{error}(Q,x,y)<\varepsilon\},$$

where $$\text{error}(Q, x, y) = \alpha \frac{Q(x, y)}{|\nabla Q(x, y)|},$$

and represents a loss function, α represents a normalization coefficient, ε represents a preset value, and $\nabla Q(x, y)$ represents a normal at an inlier on the ellipse $Q(x, y)$;

the support function is defined as:

$$\text{support}(Q, I, \text{inliers}) = \frac{b}{a} \sum_{(x,y) \in \text{inliers}} \frac{\nabla Q(x, y)}{|\nabla Q(x, y)|} \cdot \nabla I(x, y),$$

where a and b respectively represent the major and minor axes of the ellipse, and $\nabla I(x, y)$ represents a gray gradient of an inlier $(x, y)$.

Further preferably, in the step S2, a Gaussian process regression algorithm is adopted to map center coordinates $(x_l, y_l)$ and $(x_r, y_r)$ of the left and right pupils to a scene camera so as to obtain a gaze point $(x_s, y_s)$, which is calculated by the following formula:

$$\bar{f}_* = K(x_*, X)K(X,X)^{-1}f,$$

where $\bar{f}_*$ represents an expected value, which is a two-dimensional vector corresponding to the gaze point $(x_s, y_s)$, X represents a set of four-dimensional vectors composed of center coordinates of the left and right pupils in a training set, $x_*$ represents an actually measured four-dimensional vector composed of center coordinates of the left and right pupils, $K(x_*, X)$ represents a n×1 covariance matrix between the actually measured $x_*$ and the training set X, $K(X,X)$ represents a symmetric positive definite covariance matrix of the training set, and f represents a set of coordinates of gaze points on the left scene camera in the training set.

Further preferably, the step S3 of extracting the object in the left scene camera by using the target recognition and tracking algorithms comprises:

firstly, identifying bounding boxes of objects the in the left scene camera by using a target recognition algorithm, and initializing a tracking target in a tracking algorithm by using the bounding boxes of the objects, the target recognition algorithm and the tracking algorithm being synchronized; and secondly, tracking an object by using the initialized tracking algorithm, wherein if the object is lost, the tracking algorithm is reinitialized by using the result of the target recognition algorithm to improve the recognition success rate of the object in the scene camera.

Further preferably, the step S4 of performing 3D reconstruction of the object of interest to the user by using a 3D reconstruction algorithm comprises:

S41 obtaining internal and external parameters (including internal parameter matrixes and external parameter matrixes of the left and right scene cameras) and a reprojection matrix of the left scene camera and the right scene camera through binocular calibration;

S42 correcting and aligning images in the left scene camera and the right scene camera with the internal and external parameters of the left scene camera and the right scene camera;

S43 obtaining binocular disparity values of pixels of the images in the left scene camera and the right scene camera by using a feature matching algorithm, preferably, d that satisfies the following formula being the desired binocular disparity value:

$$NCC(p(x, y), d) = \underset{d}{\text{argmax}} \frac{\sum_{(x,y) \in W_P}(L(x, y) - \bar{L}) \cdot (R(x + d, y) - \bar{R_d})}{\sqrt{\sum_{(x,y) \in W_P}(L(x, y) - \bar{L})^2 \cdot \sum_{(x,y) \in W_P}(R(x + d, y) - \bar{Rd})^2}},$$

where $p(x, y)$ represents a coordinate of any point in the left scene camera, $W_p$ represents a rectangular area centered at p, $L(x, y)$ and $\bar{L}$ respectively represents a gray value at a point $(x, y)$ and a gray mean of $W_p$ in the image in the left scene camera image, and $R(x+d, y)$ and $\bar{R_d}$ respectively represents a gray value at a point $(x+d, y)$ and a gray mean of a rectangular area corresponding to the point in the image in the right scene camera; and S44 reconstructing 3D coordinates of respective pixels in the image in the left scene camera coordinate system by using the binocular disparity values and the reprojection matrix obtained by binocular calibration, thereby achieving 3D reconstruction of the object.

Further preferably, the step S5 comprises the following substeps:

S51 obtaining a transformation matrix of the eye tracker coordinate system relative to the world coordinate system by using a plurality of infrared receivers on the eye tracker in combination with an infrared generator located in the world coordinate system, specifically including:

S511 measuring a 2D coordinate $(u_i, v_i)$ of a i-th infrared receiver on the virtual plane of the infrared generator:

$$\begin{cases} u_i = \tan\alpha_i \\ v_i = \tan\beta_i \end{cases},$$

where $\alpha_i$ represents a horizontal sweep angle of a motor that drives the infrared generator to rotate horizontally, and $\beta_i$ represents a vertical sweep angle of a motor that drives the infrared generator to rotate vertically;

S512 performing direct linear transformation by using the following PnP solution model to obtain a transformation matrix [R|t] of the eye tracker coordinate system relative to the world coordinate system:

$$sx_i = [R|t]P_i,$$

where s represents an amplification factor, $x_i = (u_i, v_i, 1)^T$, $P_i = (X_i, Y_i, Z_i, 1)^T$, and $(X_i, Y_i, Z_i)$ represents a 3D coordinate of the i-th infrared receiver in the eye tracker coordinate system;

S52 obtaining a transformation matrix of the left scene camera relative to the eye tracker coordinate system through calibration; and S53 converting the pose of the object of interest in the left scene camera to a pose in the world coordinate system according to the above two transformation matrices.

According to a second aspect of the present disclosure, there is provided a device for performing the pose recognition method for an object of interest to human eyes comprising: an eye tracker, a left scene camera, a right scene camera, a left eye camera, a right eye camera and infrared receivers, wherein the eye tracker comprises an outer ring body and a head-mounted inner ring, the outer ring body and the head-mounted inner ring are connected by two moving rotating portions, an outer ring upper pinch plate is provided above the outer ring body, and bracket pinch plates are provided below the outer ring body at the two sides, so that when in use, the outer ring upper pinch plate is located behind the human head and the bracket pinch plates are located in front of the human face; the left scene camera and the right scene camera are disposed on the front side of the outer ring body to collect image information of scenes in front of the user, the left eye camera and the right eye camera are disposed at the front ends of the two bracket pinch plates to collect image information in the left and right eyes, and the infrared receivers are configured to have more than six infrared receivers uniformly distributed on the outer ring upper pinch plate.

According to a third aspect of the present disclosure, there is provided a pose recognition system for an object of interest to human eyes, comprising:

a pupil recognition module configured to respectively identify centers of left and right pupils of a user by using a left eye camera and a right eye camera;

a gaze point mapping module configured to map the obtained centers of the left and right pupils to a left scene camera to obtain a 2D gaze point;

an object of interest determination module configured to extract bounding boxes of objects in the left scene camera by using target recognition and tracking algorithms, and then determine an object of interest to the user according to a positional relationship between the 2D gaze point and the bounding boxes of the objects;

an object of interest positioning module configured to perform 3D reconstruction and pose estimation of the object of interest to the user to obtain a pose of the object of interest in the left scene camera; and a pose conversion module configured to convert the pose of the object of interest in the left scene camera to a pose in the world coordinate system, thereby determining a pose of the object of interest to the user.

In general, by comparing the above technical solution of the present inventive concept with the prior art, the present disclosure has the following beneficial effects:

1. In the method of the present disclosure, centers of the pupils of both eyes are extracted to determine a gaze point of the user, which effectively ensures the accuracy of gaze point recognition, and then ensures the accuracy of the pose determination of the object of interest.

2. In the present disclosure, two scene cameras and two eye cameras are used to achieve the recognition and pose estimation of the object of interest to a user, and in the actual working scenario, the robot arm is controlled with the user's binocular information to grasp the object of interest for the user, which facilitates the disabled.

3. In the present disclosure, by designing a plurality of infrared receivers uniformly distributed on the eye tracker, it can be ensured that the infrared light is still be received when the user's head moves in a wide range, and in combination with the position of the infrared emitter, the position of the human head can be realized, so that when in use, there is no need to ensure that the head attitude is fixed, which widens the usage scenario and improves the comfort of use. In addition, the gaze point can be converted into the world coordinate system for the subsequent further operation.

4. The existing devices generally use an object recognition algorithm to extract the object in the camera, and since the actual working background is complicated and the acquired image is unstable due to the camera shake, the recognition rate is low. In the present disclosure, the object in the left scene camera is extracted by combining the target recognition algorithm with the tracking algorithm, in which the bounding box of the object is obtained by the target recognition algorithm to reinitialize the tracking algorithm, thereby greatly improving the recognition success rate of common objects in the scene camera.

5. In the present disclosure, a random sample consensus algorithm (RANSEC algorithm) is preferably adopted to obtain center coordinates of the left and right pupils, and the extraction efficiency and accuracy of the pupil centers are greatly improved by defining inliers of the ellipse and designing the support function 6. In the present disclosure, a Gaussian process regression algorithm is preferably used to map center coordinates of the pupils to the scene camera so as to obtain a 2D gaze point, which has good stability and high precision.

7. In the present disclosure, 3D reconstruction of the object of interest to the user is performed with a 3D reconstruction algorithm, so that the coordinate of the target object in the scene camera coordinate system can be accurately positioned, and the pose of the target object can be obtained in combination with the pose recognition of the target object.

8. In the present disclosure, through combining the 2D coordinate of the infrared receiver on the virtual plane of the infrared generator with the 3D coordinate of the infrared receiver in the eye tracker coordinate system to construct a PnP problem, a pose of the eye tracker in the world coordinate system is obtained by solving the PnP problem, thereby achieving the positioning of the user's head attitude.

In these figures, 1—infrared receiver, 2—head-mounted inner ring, 3—outer ring body, 4—left scene camera, 5—right scene camera, 6—left eye camera, 7—right eye camera, 8—outer ring upper pinch plate, 9—moving rotating portion, and 10—bracket pinch plate.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the present disclosure described below can be mutually combined if they are not found to be mutually exclusive.

Figure 1:
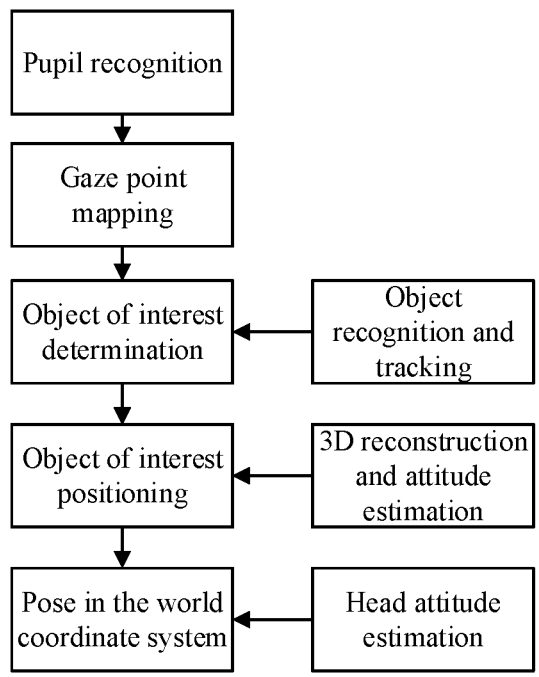
FIG. 1 is a flowchart of a pose recognition method for an object of interest to human eyes according to embodiments of the present disclosure.

As shown in FIG. 1, a pose recognition method for an object of interest to human eyes according to the embodiments of the present disclosure includes following steps:

S1 pupil recognition: respectively identify centers of left and right pupils of a user by using a left eye camera 6 and a right eye camera 7 on an eye tracker to extract information of the user's eyes;

S2 gaze point mapping: mapping the obtained centers of the left and right pupils to a left scene camera 4 to obtain a 2D gaze point;

S3 object of interest determination (object recognition and tracking): extracting bounding boxes of objects in the image in the left scene camera 4 by using target recognition and tracking algorithms, and then determining an object of interest to the user according to the positional relationship between the 2D gaze point and the bounding boxes of the objects;

S4 object of interest positioning (3D reconstruction and pose estimation): performing 3D reconstruction of the object of interest to the user to obtain a position of the object of interest in the left scene camera 4, and performing pose estimation of the object of interest to the user by using a conventional pose estimation method to obtain a pose of the object of interest in the left scene camera 4, that is, performing 3D reconstruction and pose estimation of the object of interest to the user to obtain a pose of the object of interest in the left scene camera 4;

S5 coordinate conversion in combination with the head attitude: converting the pose (position and attitude) of the object of interest in the left scene camera 4 to a pose in the world coordinate system, thereby determining a pose of the object of interest to the user.

Figure 2:
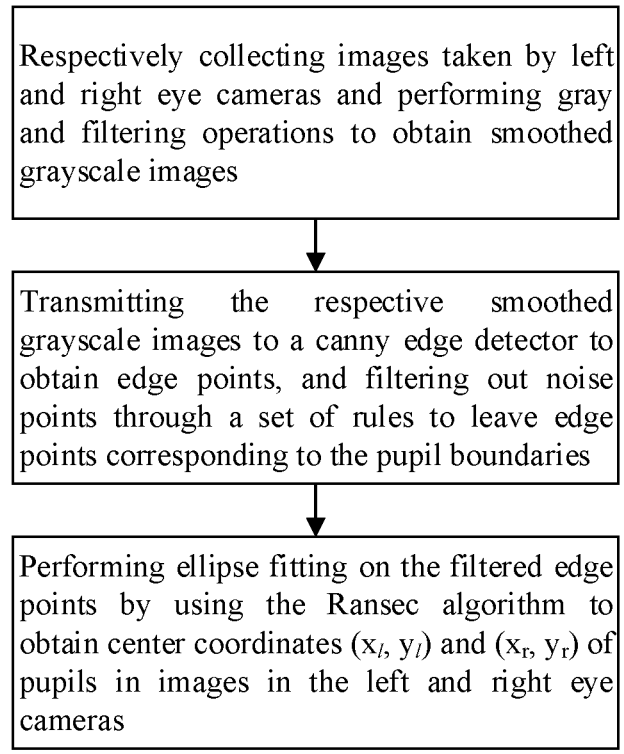
FIG. 2 is a flowchart of extracting centers of the pupils according to the embodiments of the present disclosure.

Specifically, as shown in FIG. 2, the step S1 includes following sub-steps:

S11 respectively collecting images taken by a left eye camera 6 and a right eye camera 7 and performing smoothing processing on them to obtain smoothed grayscale images, in which the smoothing processing includes grayscale and filtering operations;

S12 transmitting the respective smoothed grayscale image to an edge detector (preferably, a canny edge detector) to obtain edge points, performing filtering processing to filter out noise points (i.e., filtering out edge points that are clearly not part of the pupil boundary), thereby leaving edge points corresponding to the pupil boundary (as to how to perform the filtering processing, those skilled in the art can design filtering rules as needed, and they will not be repeated here), and constructing the edge points corresponding to the pupil boundary as a pupil edge point set (when a canny edge detector is used to perform edge detection, the detection efficiency and precision are high);

S13 performing ellipse fitting on the edge points corresponding to the pupil boundary to obtain center coordinates $(x_l, y_l)$ and $(x_r, y_r)$ of the left and right pupils, in which a random sample consensus algorithm is preferably used to perform ellipse fitting on the edge points corresponding to the pupil boundary to obtain center coordinates $(x_l, y_l)$ and $(x_r, y_r)$ of the left and right pupils, and since the parameter equation of an ellipse has 5 free variables, when ellipse fitting is performed by using the random sample consensus algorithm, at least 5 edge points are required for fitting of the parameter equation of the ellipse. In order to get the best fitted ellipse, the random sample consensus adopts an iterative method, specific steps of which are as follows:

S131 randomly selecting 5 points from the pupil edge point set to fit the plane parameter equation of the ellipse, which is expressed as:

$$Q(x,y)=Ax^2+Bxy+Cy^2+Dx+Ey+F,$$

where A~F are undetermined coefficients.

S132 calculating a value of a support function of all inliers in the pupil edge point set to the ellipse. Specifically, the inliers are defined as:

$$\text{inliers}=\{(x,y)|\text{error}(Q,x,y)<\varepsilon\},$$

where $$\text{error}(Q, x, y) = \alpha \frac{Q(x, y)}{|\nabla Q(x, y)|},$$

and represents a loss function, $\alpha$ represents a normalization coefficient, and $\varepsilon$ represents a preset value, which can be selected according to actual needs, for example, 0.5.

The support function is defined by calculating a value of a support function of the inliers to the ellipse by substituting the inliers corresponding to the ellipse into the following equation:

$$\text{support}(Q, I, \text{inliers}) = \frac{b}{a} \sum_{(x,y)\in \text{inliers}} \frac{\nabla Q(x, y)}{|\nabla Q(x, y)|} \cdot \nabla I(x, y),$$

where a and b respectively represent the major and minor axes of the ellipse, and $\nabla I(x, y)$ represents a gray gradient of a point (x, y); according to the definition of the support function, the larger the ratio $$\frac{b}{a}$$

of the minor axis to the major axis is, or the closer the grayscale gradient direction of the image at the inlier is to the normal direction at the inlier of the ellipse (i.e., the larger the value of $$\sum_{(x,y)\in \text{inliers}} \frac{\nabla Q(x, y)}{|\nabla Q(x, y)|} \cdot \nabla I(x, y)),$$

the higher the value of the support function.

S133 repeating the steps S131 to S132 for a preset number of times (for example, 20 times) to fit a plurality of ellipses, and selecting an ellipse where the support function has the maximum value, the center of the ellipse being the pupil center.

Further, the commonly used algorithms in the prior art, such as a polynomial fitting method, may be used to map the identified pupil centers to the left scene camera to obtain a 2D gaze point. In the present disclosure, a Gaussian process regression algorithm is preferably used to map center coordinates $(x_l, y_l)$ and $(x_r, y_r)$ of the pupils to a scene camera so as to obtain a gaze point $(x_s, y_s)$. Specifically, the Gaussian process is a set of random variables, any finite number of which obey the joint Gaussian distribution, and its basic principle is that a training set is constructed before prediction, the training set including a series of center coordinates of left and right pupils and coordinates of corresponding gaze points on the left scene camera, data in the training set is pre-acquired, and in the prediction, a four-dimensional vector (i.e., a test point $x_*$) is formed by the left and right pupil centers, $K(X,X)$ and $K(x_*,X)$ are calculated, and then they are substituted into an expected value calculation formula to obtain an expected value, that is, a corresponding gaze point $(x_s, y_s)$. Specifically, the mathematical model is:

$$\begin{bmatrix} f \\ f_* \end{bmatrix} \sim N\left(0, \begin{bmatrix} K(X, X)K(X, x_*) \\ K(x_*, X)K(x_*, x_*) \end{bmatrix}\right),$$

where f represents a set of coordinates of gaze points on the left scene camera in the training set, X represents a set of input vectors, which are four-dimensional vectors $x=(x_l, y_l, x_r, y_r)$ composed of center coordinates of the left and right pupils, $K(X,X)$ represents a symmetric positive definite covariance matrix of the training set, $K(x_*,X)$ represents a n×1 covariance matrix between the actually measured $x_*$ and the training set X, and $k(x_*, x_*)$ represents a covariance of the test point itself. The expected value of a predicted value is as follow:

$$\bar{f}_* = K(x_*,X)K(X,X)^{-1}f,$$

where $\bar{f}_*$ represents an expected value, i.e., a predicted value $(x_s, y_s)$ of the gaze point in the scene camera obtained by the Gaussian process regression.

Figure 3:
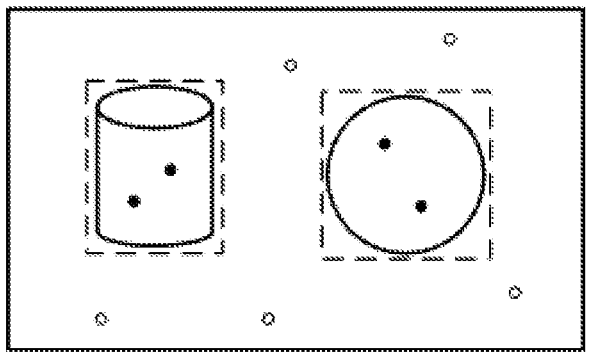
FIG. 3 is a schematic diagram of extracting an object of interest according to the embodiments of the present disclosure.

Further, the step S3 specifically includes the following sub-steps:

S31 identifying bounding boxes of objects in the left scene camera by using a target recognition algorithm. As shown in FIG. 3, the left cylinder represents a cup, the right circle represents a ball, and dotted lines containing the cup and the ball are respectively bounding boxes corresponding to the cup and the ball. The tracking target in the tracking algorithm is initialized by the bounding box, the target recognition algorithm and the tracking algorithm are performed simultaneously, and the target recognition algorithm and the tracking algorithm may be the conventional methods.

S32 tracking an object by using the initialized tracking algorithm, in which if the object is lost, the tracking algorithm is reinitialized by using the real-time result of the target recognition algorithm, and then the object tracking is continued by using the initialized tracking algorithm to obtain the bounding box of the object. Through the above method, the recognition success rate of the object in the left scene camera can be improved.

S33 determining an object of interest to the user based on the positional relationship of the 2D gaze point mapped to the left scene camera and the bounding boxes of the objects, in which, as shown in FIG. 3, if the gaze point falls within the cup bounding box (black points in the cup bounding box as shown in FIG. 3), the user is considered to be of interest to the cup; if the gaze point does not fall within the cup bounding box (white points outside the cup bounding box as shown in FIG. 3), the user is considered to be not of interest to the cup; if the gaze point falls within the ball bounding box (black points in the ball bounding box as shown in FIG. 3), the user is considered to be of interest to the ball; if the gaze point does not fall within the ball bounding box (white points outside the ball bounding box as shown in FIG. 3), the user is considered to be not of interest to the cup.

Figure 4:
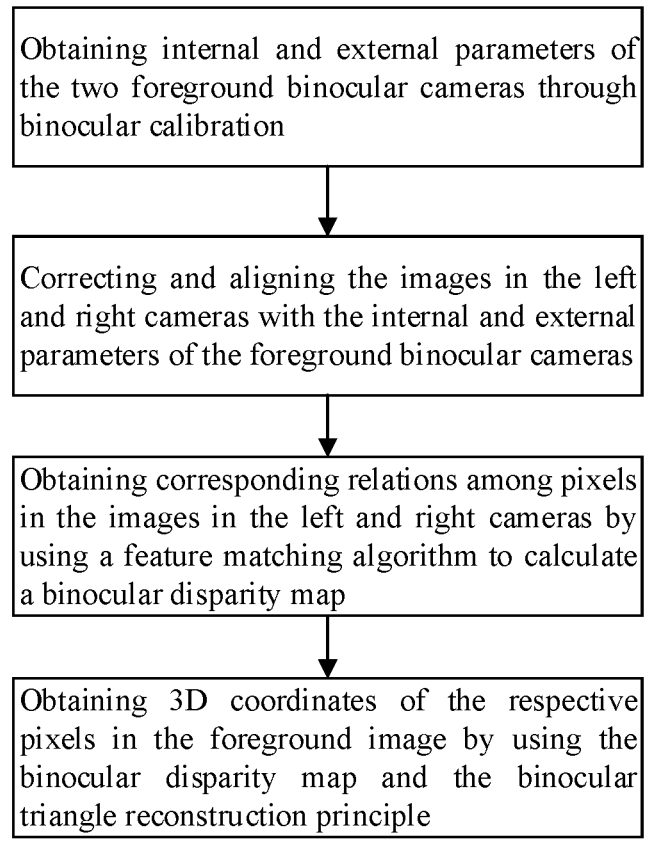
FIG. 4 is a flowchart of 3D reconstruction according to the embodiments of the present disclosure.

More specifically, as shown in FIG. 4, 3D reconstruction of the object of interest to the user is specifically as follows:

S41: obtaining internal and external parameters of the left scene camera and the right scene camera through binocular calibration (specifically including an inner parameter matrix and an outer parameter matrix of the respective left and right scene cameras), and deriving a reprojection matrix Q through the internal and external parameter matrixes;

S42: correcting the images in the left scene camera and the right scene camera with the internal and external parameters of the binocular cameras, which belongs to the prior art and will not be described here.

S43: obtaining binocular disparity values d of pixels of the images of the left scene camera and the right scene camera by using a feature matching algorithm. Preferably, the feature matching algorithm is a normalized cross-correlation algorithm, whose correlation measurement is expressed as:

$$NCC(p(x, y), d) = \underset{d}{\operatorname{argmax}} \frac{\sum_{(x,y) \in W_P} (L(x, y) - \overline{L}) \cdot (R(x + d, y) - \overline{R_d})}{\sqrt{\sum_{(x,y) \in W_P} (L(x, y) - \overline{L})^2 \cdot \sum_{(x,y) \in W_P} (R(x + d, y) - \overline{Rd})^2}},$$

where p(x, y) represents a coordinate of any point in the left scene camera, $W_p$ represents a rectangular area centered at p, L(x, y) represents a gray value at a point (x, y) in the image in the left scene camera image, $\overline{L}$ represents a gray mean of $W_p$ in the left scene camera image, R(x+d, y) represents a gray value at a point (x+d, y) in the image in the right scene camera, and $\overline{R_d}$ represents a gray mean of a rectangular area corresponding to the point (x+d, y) in the image in the right scene camera. In the formula, d that maximizes the correlation is the desired binocular disparity value.

S44: reconstructing 3D coordinates of respective pixels of the image in the left scene camera in the left scene camera coordinate system by using the binocular disparity values and the reprojection matrix Q obtained by binocular calibration to achieve 3D reconstruction of the object, the principle being as follows:

$$[XYZW]^T = Q*[xyd1]^T,$$

where [X Y Z W] represents a homogeneous coordinate in the left scene camera coordinate system, and (x, y) represents a 2D coordinate in the left scene camera coordinate system.

More specifically, the present disclosure preferably adopts the following steps to convert the pose of the object of interest in the left scene camera to a pose in the world coordinate system:

S51: obtaining a transformation matrix of the eye tracker coordinate system relative to the world coordinate system by using a plurality of infrared receivers on the eye tracker in combination with an infrared generator located in the world coordinate system, specifically including:

S511: measuring a 2D coordinate $(u_i, v_i)$ of each of the infrared receivers on the virtual plane of the infrared generator:

$$\begin{cases} u_i = \tan\alpha_i \\ v_i = \tan\beta_i \end{cases},$$

where $\alpha_i$ represents a horizontal sweep angle of the motor that drives the infrared generator to rotate horizontally, and $\beta_i$ represents a vertical sweep angle of the motor that drives the infrared generator to rotate vertically.

S512: performing direct linear transformation by using the following formula to obtain a transformation matrix [R|t] of the eye tracker coordinate system relative to the world coordinate system:

$$sx_i = [R|t]P_i.$$

The above formula is a method for solving 3D to 2D point pair motion (PnP problem), where s represents an amplification factor, $x_i = (u_i, v_i, 1)^T$, R and t respectively represent a 3×3 rotation matrix and a 3×1 translation vector, $P_i = (X_i, Y_i, Z_i, 1)^T$, and $(X_i, Y_i, Z_i)$ represents a 3D coordinate of an infrared receiver in the eye tracker coordinate system. Each point pair provides two linear constraints, and [R|t] has 12 dimensions. Therefore, the transformation matrix [R|t] can be obtained by at least 6 matching point pair, and thus more than 6 infrared receivers are provided.

S52: obtaining a transformation matrix of the left scene camera relative to the eye tracker coordinate system through calibration.

S53: converting the pose of the object of interest in the left scene camera to a pose in the world coordinate system according to the above two transformation matrices.

Figure 5:
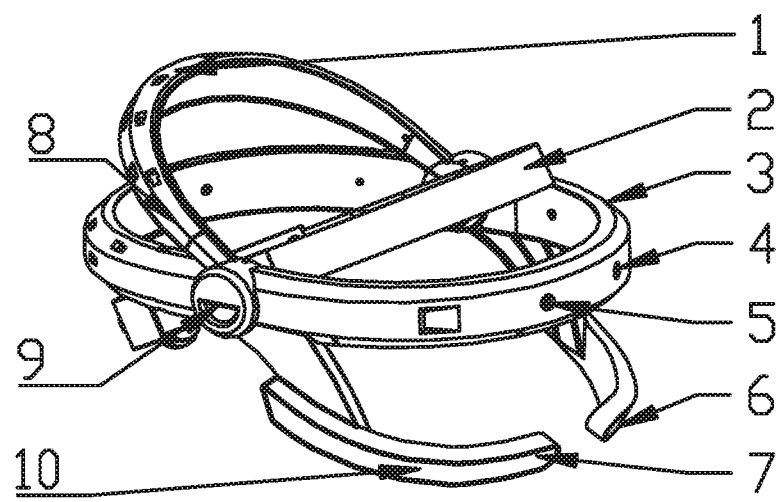
FIG. 5 is a perspective view of an object pose determining device based on a 3D gaze point of human eyes according to the embodiments of the present disclosure.
Figure 6:
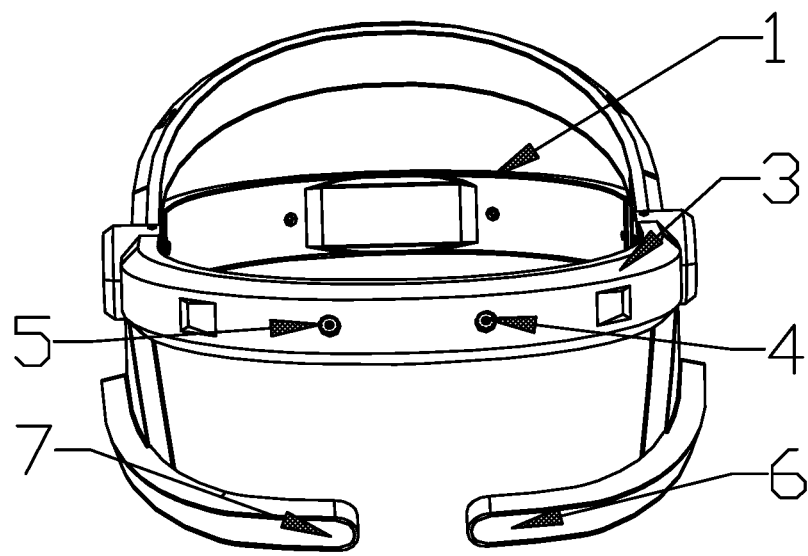
FIG. 6 is a front view of the object pose determining device based on the 3D gaze point of human eyes according to the embodiments of the present disclosure.
Figure 7:
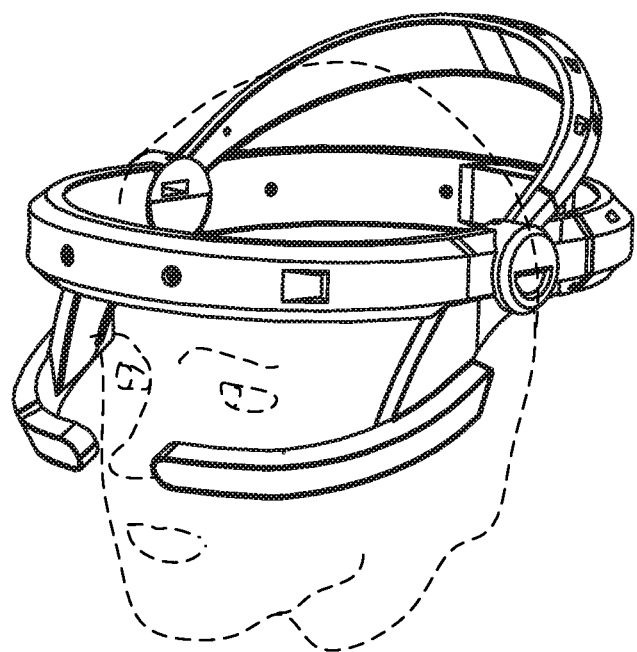
FIG. 7 is a schematic diagram of the object pose determining device based on the 3D gaze point of human eyes worn on the human head according to the embodiments of the present disclosure.

The present disclosure also provides a device for performing the above method, as shown in FIGS. 5-7, which includes an eye tracker, a left scene camera 4, a right scene camera 5, a left eye camera 6, a right eye camera 7 and infrared receivers 1, in which the eye tracker comprises an outer ring body 3 and a head-mounted inner ring 2 located inside the outer ring body 3, the outer ring body 3 and the head-mounted inner ring 2 are connected by two moving rotating portions 9, an outer ring upper pinch plate 8 is provided above the outer ring body 3, and bracket pinch plates 10 are provided below the outer ring body 3 at the two sides, so that when in use, the eye tracker is worn on the human head, the outer ring upper pinch plate 8 is located behind the human head, and the bracket pinch plates are located in front of the human face; the left scene camera 4 and the right scene camera 5 are disposed on the front side of the outer ring body 3 to collect image information of scenes in front of the user, the left eye camera 6 and the right eye camera 7 are disposed on the front ends of the two bracket pinch plates to collect image information of the human left and right eyes, the infrared receivers 1 have a plurality of infrared receivers uniformly distributed on the outer ring upper pinch plate to receive external infrared rays generated, for example, by an infrared generator disposed behind the eye tracker, and a distance between the infrared generator and the eye tracker is preferably more than one meter. When in use, the eye tracker can transmit the data of the left scene camera 4, the right scene camera 5, the left eye camera 6 and the right eye camera 7 to a data processing system (computer) through data lines, and the related data of the infrared receiver is transmitted through the wireless Bluetooth to the data processing system (computer) for head attitude estimation.

Specifically, the infrared receivers preferably have 36 infrared receivers evenly distributed on the outer ring upper pinch plate 8 to ensure that the infrared light can still be received when the user's head moves in a wide range, and a transformation matrix of the eye tracker coordinate system to the lighthouse coordinate system is obtained by solving the PnP problem. It should be noted that 36 infrared receivers are used in a preferred example, which does not intend to limit the present disclosure, and in principle, the number of infrared receivers is only required to be no less than six.

Further, the present disclosure adopts a lighthouse positioning technology, in which positioning marks (infrared receivers) are mounted on the eye tracker to realize higher-precision head attitude estimation. The lighthouse positioning technology involves a lighthouse base (infrared generator) and infrared receivers. The lighthouse base is fixed in the world coordinate system, acts as the origin of the world coordinate system, and internally has two motors with orthogonal rotation directions. A linear infrared laser emitter is mounted on each of the two motors, and all points in the space within the field of view can be swept in each rotation cycle. The infrared receivers (specifically, a set of infrared receiving diodes) are mounted on the eye tracker, and upon receiving the infrared laser, the infrared receiver can generate a response pulse, which is then transmitted to the data processing system. In the lighthouse base, there is a global exposure at the beginning of each rotation cycle, and then the motor drives the linear infrared laser emitter to sweep the entire space, which is performed once by each of the two orthogonal motors in each cycle. The infrared receiver on the eye tracker generates a longer pulse signal during global exposure and a shorter time pulse signal during subsequent laser sweeping. By processing these pulse signals, a time difference between when the global exposure is performed and when an infrared receiver is swept by the laser can be obtained. Assuming that time differences of the i-th infrared receiver swept by the horizontal and vertical sweeping lasers are respectively $\Delta t_{i1}$ and $\Delta t_{i2}$, sweep angles of the corresponding horizontal and vertical motors can be further calculated according to the motor speed r:

$$\begin{cases} \alpha_i = 2\pi \Delta t_{i1} \times \dfrac{r}{60} \\ \beta_i = 2\pi \Delta t_{i2} \times \dfrac{r}{60} \end{cases}.$$

Furthermore, a 2D coordinate of each infrared receiver on the lighthouse virtual plane can be expressed as:

$$\begin{cases} u_i = \tan\alpha_i \\ v_i = \tan\beta_i \end{cases},$$

At the same time, a 3D coordinate $P_i = (X_i, Y_i, Z_i)$ of the respective infrared receiver in the eye tracker coordinate system can be obtained by design parameters of the outer ring body.

The 3D to 2D point pair motion is a PnP problem that can be solved using a direct linear transformation:

$$sx_i = [R|t]P_i,$$

where s represents an amplification factor, $x_i = (u_i, v_i, 1)^T$, represents a homogeneous coordinate of a feature point in a normalized plane, R and t respectively represent a 3×3 rotation matrix and a 3×1 translation vector, and $P_i = (X_i, Y_i, Z_i, 1)^T$, represents a homogeneous coordinate of the feature point corresponding to a space point. Each point pair provides two linear constraints, [R|t] has 12 dimensions, and thus, the transformation matrix can be obtained by at least 6 matching point pair.

Further, two ends of the head-mounted inner ring 2 are connected by ratchet locking mechanisms and formed into a ring. The length of the inner ring can be adjusted by the ratchet locking mechanisms to adapt to the size of the user's head. Preferably, a soft sponge can be attached to the inside of the inner ring to improve the wearing comfort and prevent the eye tracker from sliding relative to the head. The left scene camera 4 and the right scene camera 5 are binocular cameras fixed to the front of the outer ring body through mounting holes, and the two scene cameras can collect image information of scenes in front of the user, recognize the target object by the target recognition algorithm, and then obtain a 3D coordinate of the target object by the binocular three-dimensional reconstruction algorithm. The left eye camera 6 and the right eye camera 7 are two infrared cameras, which are fixed at the front ends of the bracket pinch plates 10 and are located below the outer ring body 3. By adjusting the two bracket pinch plates 10, the left eye camera 6 and the right eye camera 7 can be respectively aligned with the left and right eyes of the user, and an infrared light source is provided outside each of the left and right eye cameras so that when the infrared light source gets close to the optical axis of the camera, a darkening effect will be generated, that is, in the image in the infrared camera, the color of the pupil area becomes darker, and the colors of the iris and other areas become lighter, which is beneficial to the extraction of the pupil.

The device designed and researched by the present disclosure has the advantages of compact structure, beautiful shape, comfortable wearing and lightness, can position the user's head to greatly weaken the user's use restriction, and can also identify and position the object of interest to the user with high precision.

In addition, the present disclosure also devises a system matched with the above method. Specifically, the system includes:

a pupil recognition module configured to respectively identify centers of left and right pupils of a user by using a left eye camera and a right eye camera;

a gaze point mapping module configured to map the obtained centers of the left and right pupils to a left scene camera to obtain a 2D gaze point;

an object of interest determination module configured to extract bounding boxes of objects in the left scene camera by using target recognition and tracking algorithms, and then determine an object of interest to the user according to a positional relationship between the 2D gaze point and the bounding boxes of the objects;

an object of interest positioning module configured to perform 3D reconstruction and pose estimation of the object of interest to the user to obtain a pose of the object of interest in the left scene camera; and a pose conversion module configured to convert the pose of the object of interest in the left scene camera to a pose in the world coordinate system, thereby determining a pose of the object of interest to the user.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A pose recognition method for an object of interest to human eyes, comprising:

S1 respectively identifying centers of left and right pupils of a user by using a left eye camera and a right eye camera on an eye tracker to extract information of the user's eyes;

S2 mapping the obtained centers of the left and right pupils to a left scene camera (4) to obtain a 2D gaze point;

S3 extracting bounding boxes of objects in the left scene camera by using target recognition and tracking algorithms, and then determining an object of interest to the user according to a positional relationship between the 2D gaze point and the bounding boxes of the objects;

S4 performing 3D reconstruction and pose estimation of the object of interest to the user to obtain a pose of the object of interest in the left scene camera;

S5 converting the pose of the object of interest in the left scene camera to a pose in the world coordinate system, thereby determining a pose of the object of interest to the user, wherein the step S1 comprises following substeps:

S11 respectively collecting images taken by a left eye camera and a right eye camera and performing smoothing processing on them to obtain smoothed grayscale images;

S12 transmitting the respective smoothed grayscale image to an edge detector to obtain edge points, performing filtering processing to filter out noise points, thereby leaving edge points corresponding to a pupil boundary, and constructing the edge points corresponding to the pupil boundary as a pupil edge point set; and S13 performing ellipse fitting on the edge points corresponding to the pupil boundary to obtain center coordinates $(x_l, y_l)$ and $(x_r, y_r)$ of the left and right pupils, and wherein a random sample consensus algorithm is adopted to perform ellipse fitting on the edge points corresponding to the pupil boundary to obtain the center coordinates of the left and right pupils, specifically comprising:

S131 randomly selecting 5 points from the respective pupil edge point set to fit a plane parameter equation of an ellipse;

S132 calculating a value of a support function of all inliers in the pupil edge point set to the ellipse; and S133 repeating the steps S131 to S132 for a preset number of times to obtain a parameter equation of the ellipse where the support function has the maximum value, the center of the ellipse being the center of the pupil.

2. The pose recognition method for an object of interest to human eyes according to claim 1, wherein the plane parameter equation of the ellipse is expressed as:

$$Q(x,y)=Ax^2+Bxy+Cy^2+Dx+Ey+F,$$

where A~F are undetermined coefficients;

the inliers are defined as:

$$\text{inliers}=\{(x,y)|\text{error}(Q,x,y)<\varepsilon\},$$

where $$\text{error}(Q, x, y) = \alpha \frac{Q(x, y)}{|\nabla Q(x, y)|},$$

and represents a loss function, represents a normalization coefficient, ε represents a preset value, and ∇Q(x,y) represents a normal at an inlier on the ellipse Q(x,y);

the support function is defined as:

$$\text{support}(Q, I, \text{inliers}) = \frac{b}{a} \sum_{(x,y)\in \text{inliers}} \frac{\nabla Q(x, y)}{|\nabla Q(x, y)|} \cdot \nabla I(x, y),$$

where a and b respectively represent the major and minor axes of the ellipse, and ∇l(x,y) represents a gray gradient of an inlier (x,y).

3. A pose recognition method for an object of interest to human eyes, comprising:

S1 respectively identifying centers of left and right pupils of a user by using a left eye camera and a right eye camera on an eye tracker to extract information of the user's eyes;

S2 mapping the obtained centers of the left and right pupils to a left scene camera (4) to obtain a 2D gaze point;

S3 extracting bounding boxes of objects in the left scene camera by using target recognition and tracking algorithms, and then determining an object of interest to the user according to a positional relationship between the 2D gaze point and the bounding boxes of the objects;

S4 performing 3D reconstruction and pose estimation of the object of interest to the user to obtain a pose of the object of interest in the left scene camera;

S5 converting the pose of the object of interest in the left scene camera to a pose in the world coordinate system, thereby determining a pose of the object of interest to the user, wherein in the step S2, a Gaussian process regression algorithm is adopted to map center coordinates $(x_l, y_l)$ and $(x_r, y_r)$ of the left and right pupils to a scene camera so as to obtain a gaze point $(x_s, y_s)$, which is calculated by the following formula:

$$\bar{f}_* = K(x_*, X)K(X, X)^{-1} f,$$

where $\bar{f}_*$ represents an expected value, which is a two-dimensional vector corresponding to the gaze point $(x_s, y_s)$, X represents a set of four-dimensional vectors composed of center coordinates of the left and right pupils in a training set, $x_s$ represents an actually measured four-dimensional vector composed of center coordinates of the left and right pupils, $K(x_e, X)$ represents a n×1 covariance matrix between the actually measured $x_s$ and the training set X, K(X,X) represents a symmetric positive definite covariance matrix of the training set, and f represents a set of coordinates of gaze points on the left scene camera in the training set.

4. The pose recognition method for an object of interest to human eyes according to claim 1, wherein the step S3 of extracting the object in the left scene camera by using the target recognition and tracking algorithms comprises:

firstly, identifying bounding boxes of objects in the left scene camera by using a target recognition algorithm, and initializing a tracking target in a tracking algorithm by using the bounding boxes of objects, the target recognition algorithm and the tracking algorithm being synchronized; and secondly, tracking an object by using the initialized tracking algorithm, wherein if the object is lost, the tracking algorithm is reinitialized by using the result of the target recognition algorithm to improve the recognition success rate of the object in the scene camera.

5. A pose recognition method for an object of interest to human eyes, comprising:

S1 respectively identifying centers of left and right pupils of a user by using a left eye camera and a right eye camera on an eye tracker to extract information of the user's eyes;

S2 mapping the obtained centers of the left and right pupils to a left scene camera (4) to obtain a 2D gaze point;

S3 extracting bounding boxes of objects in the left scene camera by using target recognition and tracking algorithms, and then determining an object of interest to the user according to a positional relationship between the 2D gaze point and the bounding boxes of the objects;

S4 performing 3D reconstruction and pose estimation of the object of interest to the user to obtain a pose of the object of interest in the left scene camera;

S5 converting the pose of the object of interest in the left scene camera to a pose in the world coordinate system, thereby determining a pose of the object of interest to the user, wherein the step S4 of performing 3D reconstruction of the object of interest to the user by using a 3D reconstruction algorithm comprises:

S41 obtaining internal and external parameters and a reprojection matrix of the left scene camera and the right scene camera through binocular calibration;

S42 correcting and aligning images in the left scene camera and the right scene camera with the internal and external parameters of the left scene camera and the right scene camera;

S43 obtaining binocular disparity values of pixels of the images in the left scene camera and the right scene camera by using a feature matching algorithm, preferably, d that satisfies the following formula being the desired binocular disparity value:

$$NCC(p(x,y), d) = \underset{d}{\mathrm{argmax}} \frac{\sum_{(x,y)\in W_P}(L(x,y)-\overline{L})\cdot(R(x+d,y)-\overline{R_d})}{\sqrt{\sum_{(x,y)\in W_P}(L(x,y)-\overline{L})^2 \cdot \sum_{(x,y)\in W_P}(R(x+d,y)-\overline{R_d})^2}},$$

where p(x, y) represents a coordinate of any point in the left scene camera, $W_p$ represents a rectangular area centered at p, L(x,y) and $\overline{L}$ respectively represents a gray value at a point (x, y) and a gray mean of $W_p$ in the image in the left scene camera image, and R(x+d,y) and $\overline{R}_d$ respectively represents a gray value at a point (x+d, y) and a gray mean of the rectangular area corresponding to the point in the image in the right scene camera; and S44 reconstructing 3D coordinates of respective pixels in the image in the left scene camera coordinate system by using the binocular disparity values and the reprojection matrix obtained by binocular calibration, thereby achieving 3D reconstruction of the object.

6. The pose recognition method for an object of interest to human eyes according to claim 1, wherein the step S5 comprises the following substeps:

S51 obtaining a transformation matrix of the eye tracker coordinate system relative to the world coordinate system by using a plurality of infrared receivers on the eye tracker in combination with an infrared generator located in the world coordinate system, specifically including:

S511 measuring a 2D coordinate $(u_i, v_i)$ of a i-th infrared receiver on the virtual plane of the infrared generator:

$$\begin{cases} u_i = \tan\alpha_i \\ v_i = \tan\beta_i \end{cases},$$

where z represents a horizontal sweep angle of a motor that drives the infrared generator to rotate horizontally, and $\gamma_L$ represents a vertical sweep angle of a motor that drives the infrared generator to rotate vertically;

S512 performing direct linear transformation by using the following PnP solution model to obtain a transformation matrix [R|t] of the eye tracker coordinate system relative to the world coordinate system:

$$sx_t = [R|t] P_t,$$

where s represents an amplification factor, $x_t = (u_t, v_t, 1)^T$, $P_t = (X_t, Y_t, Z_t, 1)^T$, and $(X_t, Y_t, Z_t)$ represents a 3D coordinate of the i-th infrared receiver in the eye tracker coordinate system;

S52 obtaining a transformation matrix of the left scene camera relative to the eye tracker coordinate system through calibration; and S53 converting the pose of the object of interest in the left scene camera to a pose in the world coordinate system according to the above two transformation matrices.

7. A device for performing the pose recognition method for an object of interest to human eyes according to claim 1, comprising: an eye tracker, a left scene camera, a right scene camera, a left eye camera, a right eye camera and infrared receivers, wherein the eye tracker comprises an outer ring body and a head-mounted inner ring, the outer ring body and the head-mounted inner ring are connected by two moving rotating portions, an outer ring upper pinch plate is provided above the outer ring body, and bracket pinch plates are provided below the outer ring body at the two sides, so that when in use, the outer ring upper pinch plate is located behind the human head and the bracket pinch plates are located in front of the human face; the left scene camera and the right scene camera are disposed on the front side of the outer ring body to collect image information of scenes in front of the user, the left eye camera and the right eye camera are disposed at the front ends of the two bracket pinch plates to collect image information in the left and right eyes, and the infrared receivers are configured to have more than six infrared receivers uniformly distributed on the outer ring upper pinch plate.

8. A pose recognition system for an object of interest to human eyes, comprising:

a pupil recognition module configured to respectively identify centers of left and right pupils of a user by using a left eye camera and a right eye camera;

a gaze point mapping module configured to map the obtained centers of the left and right pupils to a left scene camera to obtain a 2D gaze point;

an object of interest determination module configured to extract bounding boxes of objects in the left scene camera by using target recognition and tracking algorithms, and then determine an object of interest to the user according to a positional relationship between the 2D gaze point and the bounding boxes of the objects;

an object of interest positioning module configured to perform 3D reconstruction and pose estimation of the object of interest to the user to obtain a pose of the object of interest in the left scene camera; and a pose conversion module configured to convert the pose of the object of interest in the left scene camera to a pose in the world coordinate system, thereby determining a pose of the object of interest to the user, wherein the pupil recognition module is configured to:

S11 respectively collecting images taken by a left eye camera and a right eye camera and performing smoothing processing on them to obtain smoothed grayscale images;

S12 transmitting the respective smoothed grayscale image to an edge detector to obtain edge points, performing filtering processing to filter out noise points, thereby leaving edge points corresponding to a pupil boundary, and constructing the edge points corresponding to the pupil boundary as a pupil edge point set; and S13 performing ellipse fitting on the edge points corresponding to the pupil boundary to obtain center coordinates $(x_l, y_l)$ and $(x_r, y_r)$ of the left and right pupils, and wherein a random sample consensus algorithm is adopted to perform ellipse fitting on the edge points corresponding to the pupil boundary to obtain the center coordinates of the left and right pupils, specifically comprising:

S131 randomly selecting 5 points from the respective pupil edge point set to fit a plane parameter equation of an ellipse;

S132 calculating a value of a support function of all inliers in the pupil edge point set to the ellipse; and S133 repeating the steps S131 to S132 for a preset number of times to obtain a parameter equation of the ellipse where the support function has the maximum value, the center of the ellipse being the center of the pupil.

* * * * *